United States Patent [19]
Swanson

[11] Patent Number: 5,460,077
[45] Date of Patent: Oct. 24, 1995

[54] LINEAR THRUSTER WITH COMPLIANT HEAD

[76] Inventor: David W. Swanson, 2750 Felicita Rd., Escondido, Calif. 92029

[21] Appl. No.: 284,842

[22] Filed: Aug. 2, 1994

[51] Int. Cl.⁶ .................. F16J 1/10; F16J 15/18
[52] U.S. Cl. ............................ 92/84; 92/165 R
[58] Field of Search ............... 92/84, 161, 165 R, 92/165 PR, 167

[56] References Cited

U.S. PATENT DOCUMENTS

| | | | |
|---|---|---|---|
| 751,997 | 10/1902 | Prescott | 92/165 R X |
| 2,975,761 | 3/1961 | Fairchild | 92/84 |
| 3,135,292 | 6/1964 | Roberts | 92/161 X |
| 3,788,196 | 1/1974 | Sandlin | 92/13 |
| 4,034,867 | 7/1977 | Akagawa | 92/165 PR X |
| 4,473,249 | 9/1984 | Valentine et al. | |
| 4,480,685 | 11/1984 | Gilbertson | 92/161 X |
| 4,543,034 | 9/1985 | Blatt et al. | 92/161 X |
| 4,736,675 | 4/1988 | Stoll | 92/165 PR X |
| 5,061,144 | 10/1991 | Akimoto et al. | |

FOREIGN PATENT DOCUMENTS

2044854 10/1980 United Kingdom ............... 92/165 R

*Primary Examiner*—John E. Ryznic
*Attorney, Agent, or Firm*—Calif Tervo

[57] ABSTRACT

A linear thruster (10) comprises a thruster assembly (15) and a compliant head assembly (100). Thruster assembly (15) includes a housing (20), a pair of guide rods (30) supported by bearings (29) in housing (20), a thrust plate (40) attached below housing (20) to guide rods 30, a power unit, such as pneumatic cylinder (50), and a thrust rod (60). Compliant head assembly (100) includes a translation block (120), a set of first leaf springs (140) supporting translation block (120) above thrust plate (40) such that translation block (120) can move forward and rearward, a compliant head (160), and a set of second leaf springs (180) supporting compliant head (160) from translation block (120) at a position below thrust plate (40) such that compliant head (160) can move left and right due to resiliency of second leaf springs (180) and forward and rearward with movement of translation block (120).

31 Claims, 5 Drawing Sheets

LINEAR THRUSTER WITH COMPLIANT HEAD

BACKGROUND OF THE INVENTION

1. Field of the Invention

This invention relates in general linear thrusters having compliant heads and more specifically to a linear thruster having a compliant head supported by leaf springs.

2. Description of the Related Art

Linear thrusters are used to perform a variety of tasks, notably the pick-up and placement of parts, such as electronic components or labels, in assembly lines. A conventional linear thruster includes a thrust plate that is moved by a power unit, such as a pneumatic cylinder, back and forth along a thrust axis. The thrust plate may be fitted with a tool to perform a given task. Typically, the thrust plate is mounted for very precise movement so as to assure very precise registration of assembled parts. Additionally, the movement is quite strong and inflexible in order to resist forces encountered in collisions. In many processes, tolerances are such that a fixed thrust plate tool will not always register or align with the work piece. To help assure registration, chamfers may be added to guide tools, piece or part to deflect the thrust plate into registration. However, because of the desirability of precise registration of the thrust plate, only small tolerances can be corrected for in this manner.

Therefore, it would be desirable to have a compliant head addition to a linear thruster to allow registration where tolerances are large. Chamfers on guide pieces can deflect the compliant head into proper registry.

It is desirable that such a compliant head still provide precise registration when desired, be easily aligned, and retain alignment and return to center after each deflection.

It is further desirable that such a compliant head not be easily damaged by collisions.

It is further desirable that such a compliant head be compact so as to not significantly alter the current work space environment.

SUMMARY OF THE INVENTION

This invention is a linear thruster including a compliant head. In an exemplary embodiment, a linear thruster assembly comprises a housing, a plurality of spaced, parallel guide rods supported by the housing in vertical sliding axial movement with respect to the housing, a thrust plate attached below the housing to the guide rods and moveable therewith, and a power unit having a thrust rod attached to the thrust plate for moving the thrust plate.

A compliant head assembly includes a translation block, a set of first leaf springs supporting the translation block above the thrust plate such that the translation block can move forward and rearward, a compliant head, and a set of second leaf springs supporting the compliant head from the translation block at a position below the thrust plate such that said compliant head can move left and right due to resiliency of the second leaf springs and forward and rearward with movement of the translation block.

In an alternate embodiment, a short stroke thruster has the translation block supported above a thruster housing.

Bores, that surround the guide rods or extensions of the guide rods in the translation block and compliant head, limit movement of translation block and compliant head, thereby providing crash protection to the springs.

Various devices are provided for restricting movement of the translation block or the compliant head in the retracted position or in the extended position.

Other features and many attendant advantages of the invention will become more apparent upon a reading of the following detailed description together with the drawings in which like reference numerals refer to like parts throughout.

DETAILED DESCRIPTION OF THE INVENTION

In the following description and claims, the directional terms, e.g. "down", "up", "left", "right", "front", "rear" "vertical" and "horizontal", are used for simplicity to describe relative directions of the elements and are not intended to be literal.

Figure 1:
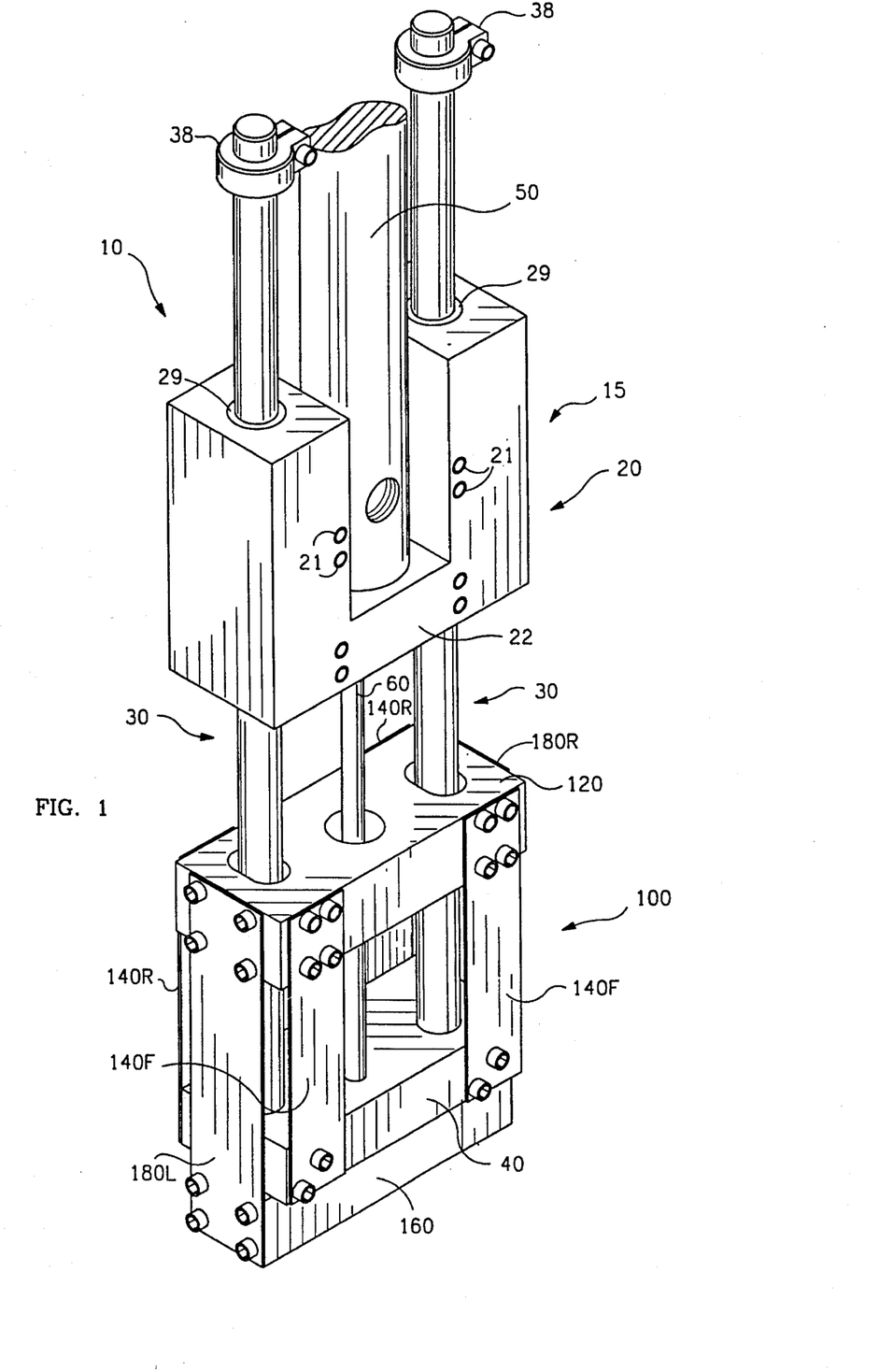
FIG. 1 is a perspective view of a preferred embodiment of the linear thruster with compliant head of the invention.

With reference now to the drawings, and more particularly to FIGS. 1 thereof, there is shown a perspective view of a preferred embodiment of the linear thruster, denoted generally as 10, of the invention. Thruster 10 generally comprises a thruster assembly 15 and a compliant head assembly 100. Thruster assembly 15 generally includes a housing 20, a pair of parallel guide rods 30 supported by bearings 29 in housing 20, a thrust plate 40 attached below housing 20 to guide rods 30, a power unit, such as pneumatic cylinder 50, and a thrust rod 60. Compliant head assembly 100 generally includes a translation block 120, a set of first leaf springs 140, a compliant head 160, and a set of second leaf springs 180.

Figure 2:
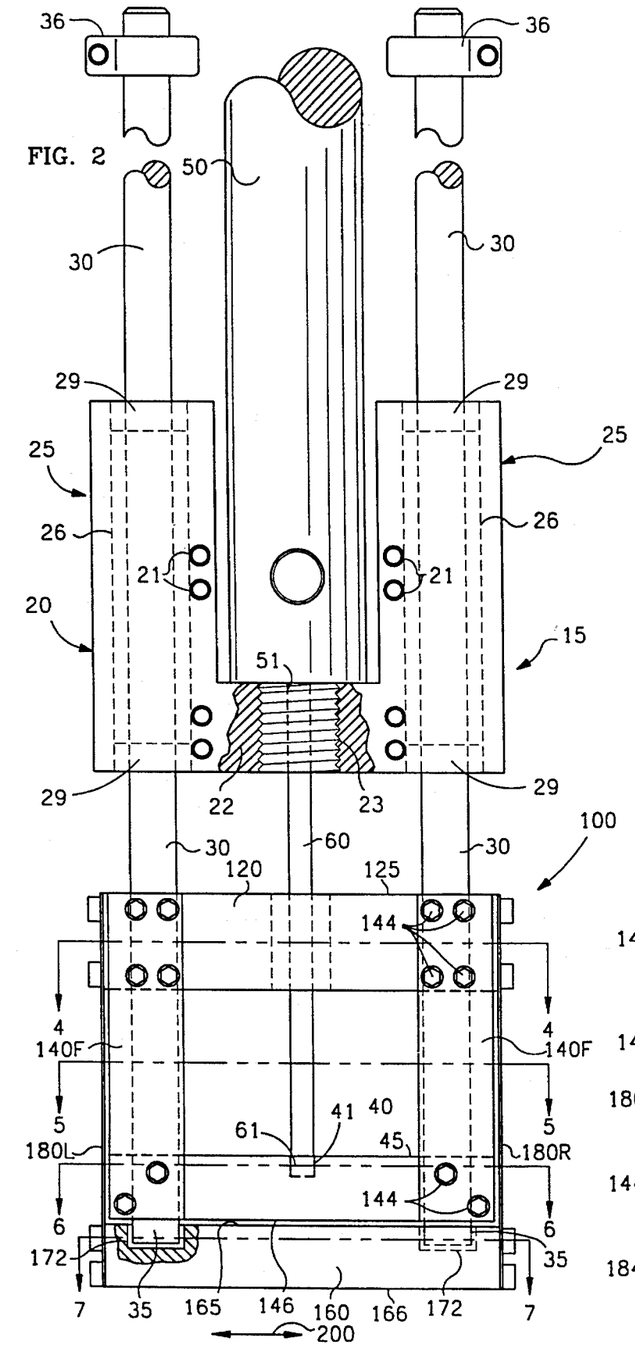
FIG. 2 is a front elevation view, partially cut away, of the linear thruster of FIG. 1.
Figure 3:
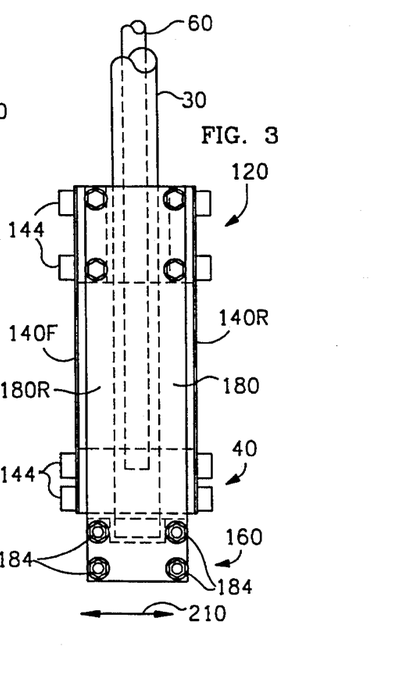
FIG. 3 is a partial right side view of the linear thruster of FIG. 2.
Figure 4:
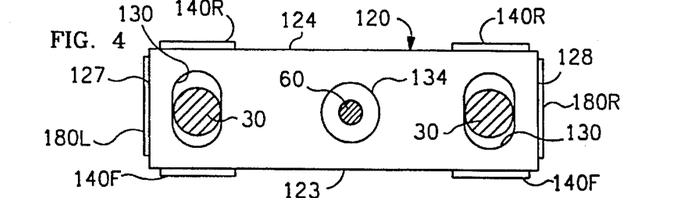
FIG. 4 is sectional view taken on line 4—4 of the linear thruster of FIG. 2
Figure 5:
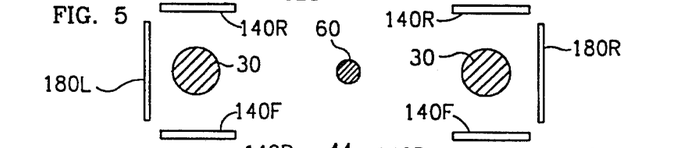
FIG. 5 is sectional view taken on line 5—5 of the linear thruster of FIG. 2
Figure 6:
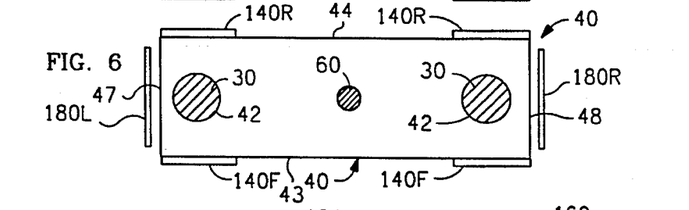
FIG. 6 is sectional view taken on line 6—6 of the linear thruster of FIG. 2
Figures 7, 12, 13:
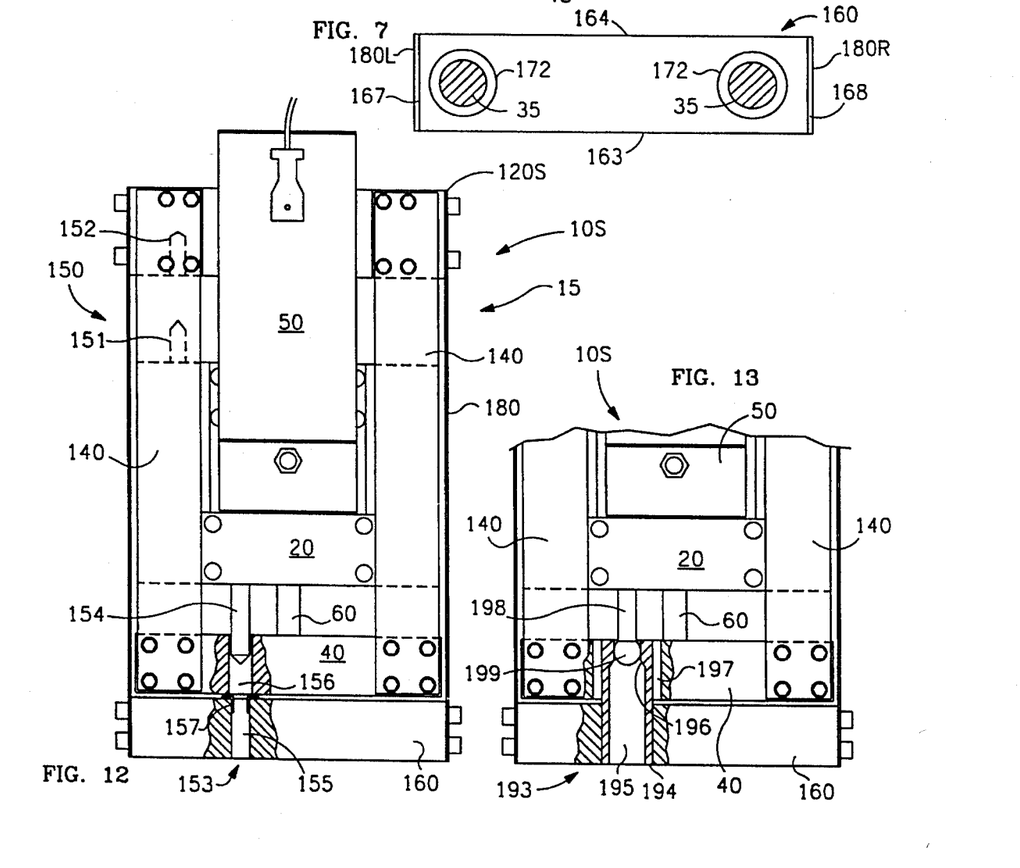
FIG. 7 is sectional view taken on line 7—7 of the linear thruster of FIG. 2
FIG. 12 is a front elevation view, partially cut away, of the linear thruster of FIG. 9 including devices for restricting compliance in the retracted position.
FIG. 13 is a partial front elevation view, partially cut away, of the linear thruster of FIG. 9 including devices for restricting compliance in the extended position.

With further reference to FIGS. 2–7, FIG. 2 is a front elevation view, partially cut away, of thruster 10 of FIG. 1, FIG. 3 is a partial right side view of FIG. 2, FIG. 4 is sectional view taken on line 4-4 of FIG. 2, FIG. 5 is sectional view taken on line 5-5 of FIG. 2, FIG. 6 is sectional view taken on line 6–6 of FIG. 2 and FIG. 7 is sectional view taken on line 7–7 of FIG. 2.

Housing 20, shown, is of a typical and representative configuration but many other configurations are possible. Housing 20 is typically constructed of metal and may be machined from a solid block or fabricated of individual components. Housing 20 includes suitable mounting means, such as threaded bores 21, for mounting thruster 10 to a machine. Housing 20 includes a bottom plate 22 and bearing blocks 25. Bottom plate 22 includes a threaded bore 23 for receiving a threaded lower end 51 of cylinder 50. Thrust rod 60 also passes through bore 23. Each bearing block 25 includes a vertical guide bore 26 retaining bearings 29. Guide rods 30 are installed in bearings 29 in each bore 26 to provide precise vertical sliding axial non-rotational linear movement of thrust plate 40 during the entire linear stroke. Thrust plate 40 is attached below housing 20 to guide rods 30 and moveable therewith in a thrust direction defining a thrust axis from a retracted position to an extended position. Cylinder 50 includes a piston, not shown, operatively connected to thrust rod 60 for reciprocally moving thrust rod 60 between the extended and retracted positions. Thrust rod 60 is attached to thrust plate 40 by suitable means, such as threaded end 61 in bore 41, for moving thrust plate 40. Means, such as stop collars 38 affixed at a desired location to guide rods 30, limit the movement of guide rods 30. Collars 38, shown, are attached to the upper end of guide rods 30 and encounter housing 20 thereby limiting the extension stroke. Similar collars 38 could be attached to guide rods 30 below housing 20 to limit the retraction stroke.

The above describes a representative linear thruster. It will be seen that the invention, in its simplest form, is adaptable for use with almost any linear thruster, regardless of the configuration, or even existence, of all of the above-described elements. For example, the guide rods may act as thrust rods and no thrust rod need be present. Alternatively, the thrust rod may be adapted to also be a guide rod and guide rods need not be present.

In the preferred embodiment of FIG. 2 and as seen in FIG. 6, guide rods 30 are press fit into bores 42 through thrust plate 40 such that guide rods 30 extend below thrust plate 40. Thrust plate 40 has a front side 43, rear side 44, top 45, bottom, 46, left side 47 and right side 48.

Translation block 120 includes a front side 123, rear side 124, top 125, bottom, 126, left side 127 and right side 128.

A first spring means, such as set of first leaf springs 140, supports translation block 120 above thrust plate 40 such that translation block 120 can move, due to resiliency of first leaf springs 140, forward and rearward defining a movement axis orthogonal to the thrust axis. First leaf springs 140 are parallel and spaced and rigid in the directions of their plane which is vertical and left to right. Therefore, they are only resilient in the forward and rearward direction. Front first leaf springs 140F connect thrust plate front side 43 with translation block front side 123 and rear first leaf springs 140R connect thrust plate rear side 44 with translation block rear side 124. Fasteners, such as plurality of bolts 144, fixedly retain springs 140 to thrust plate 40 and translation block 120. Although first leaf springs 140 are shown as four springs, more or fewer springs could be used as desired.

Looking primarily at FIGS. 2 and 4, translation block 120 includes guide rod openings 130 and thrust rod opening 134 therethrough, through which are freely disposed guide rods 30 and thrust rod 60, respectively. Guide rod openings 130 provide crash protection to springs 140 and 180 and to thrust rod 60. Preferably, guide rod openings 130 are adapted to prevent left-right movement of translation block 120 relative to guide rods 30 and adapted to allow a pre-determined amount of forward-backward movement of translation block 120 relative to guide rods 30. In the preferred embodiment, this is accomplished by having openings 130 just slightly larger left to right than guide rods 30 and larger forward and rearward by a predetermined distance predicated on springs 140, 180 not being harmed. The clearance around thrust rod 60 in opening 134 is at least as great as the predetermined distance. Consequently, any sideward force on translation block 120 is immediately taken by guide rods 30 and, a front or rear force is taken by guide rods 30 after translation block 120 moves the predetermined distance. If left-right movement of translation block 120 is prevented by the shape of guide rod openings 130 in translation block 120, then the first spring means may be another type of constant length spring, such as a flexible rod.

Compliant head 160 includes a front side 163, rear side 164, top 165, bottom, 166, left side 167 and right side 168.

A set of second leaf springs 180 support compliant head 160 from translation block 120 at a position below thrust plate 40 such that compliant head 160 can move left and right, as shown with movement arrows 200, due to resiliency of second leaf springs 180 and forward and rearward, as shown with movement arrows 210, with movement of translation block 120. Second leaf springs 180 are parallel and spaced and rigid in the directions of their plane which is vertical and forward and rearward. Therefore, they are only resilient in the left-right direction. Left second leaf spring 180L connects translation block left side 127 with compliant head left side 167 and right second leaf springs 180R connects translation block right side 128 with compliant head right side 168. Fasteners, such as plurality of bolts 184, fixedly retain springs 180 to compliant head 160 and translation block 120. Although second leaf springs 180 are shown as two springs, more or fewer springs could be used as desired. Compliant head 160, supported as described above, can move a limited distance orthogonal in all directions to the thrust axis.

The linear gaps between springs 140, 180 and the remainder of thruster 10 provide excellent visual references and feed back as to alignment of compliant head 160. An extremely small variation on the narrow parallelogram gap is easily visually detectable. Although a specific number of leaf springs are shown, the number many vary according to size, cross-section, length, material, and desired spring constant. Full hard stainless steel makes excellent leaf springs that are very uniform, have low residual stress, and are easily paired. Springs 140, 180 may be of other materials, such as fiberglass or plastic.

Compliant head 160 is also provided with crash protection means 170 for protecting springs 140, 180. Crash protection means 170 operates between thrust plate 40 and compliant head 160 for allowing a pre-determined amount of forward-backward and left-right movement of compliant head 160 relative to thrust plate 40. In the preferred embodiment, a crash bolt, such as extensions 35 of guide rods 30, extends downward from thrust plate 40 and compliant head 160 includes a crash bore 172 receiving rod extension 35. As best seen in FIG. 7, the free play of rod extensions 35 in bores 172 determines the amount of forward-backward and left-right movement of translation block 160 relative to guide rods 30 and thrust plate 40. Alternately, a crash bolt may protrude from compliant head 160 and cooperate with a crash bore in thrust plate 40.

Compliant head 160 is crash protected form the bottom.

Crashes from the bottom, i.e. large upward forces, force compliant head 160 across the small separation gap with thrust plate 40 into contact with thrust plate 40. This movement will slightly bow second leaf springs 180 which will return undamaged to their original position after the crash.

Figure 8:
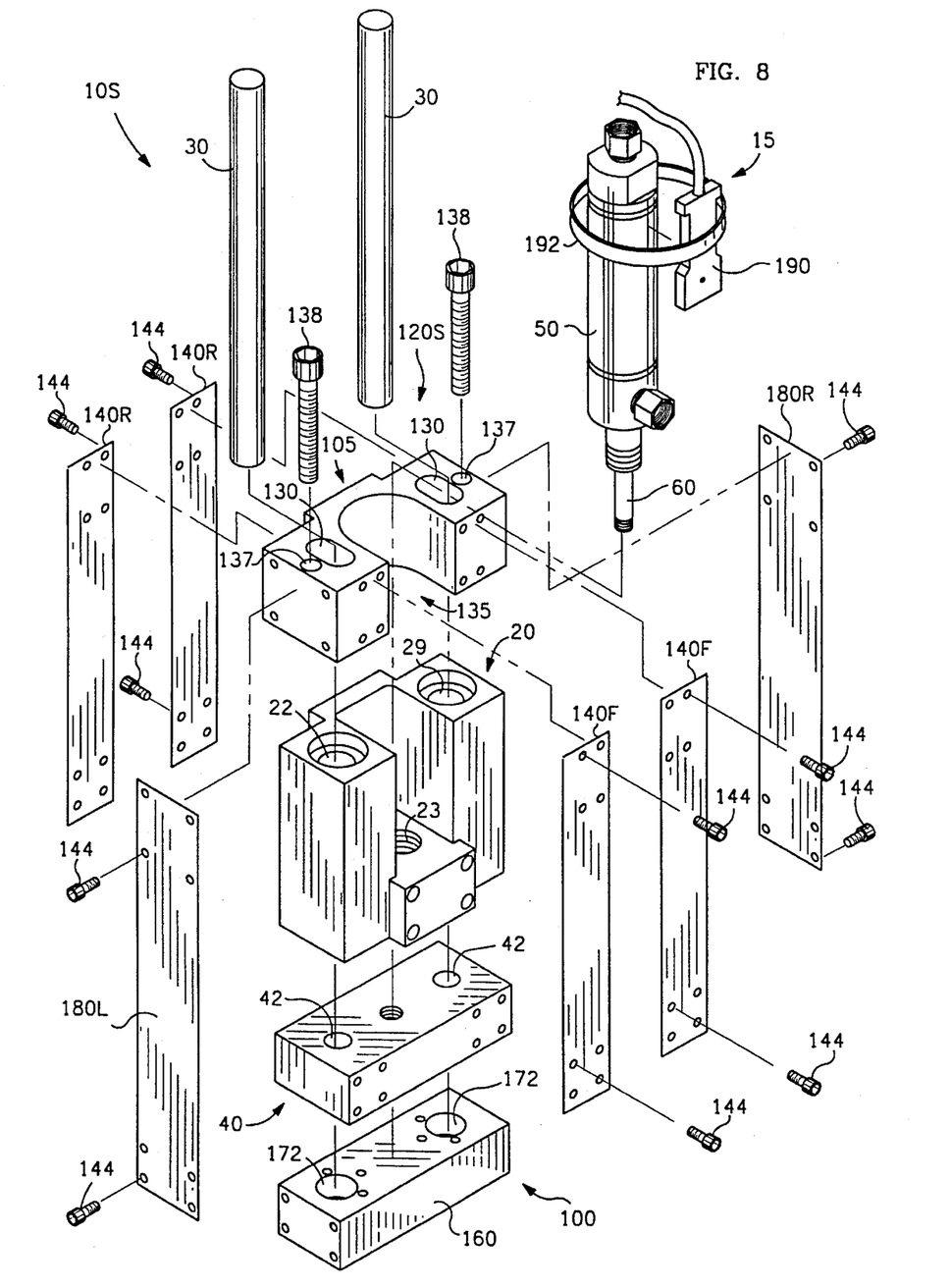
FIG. 8 is an exploded view of an alternate embodiment of the linear thruster of the invention.
Figure 9:
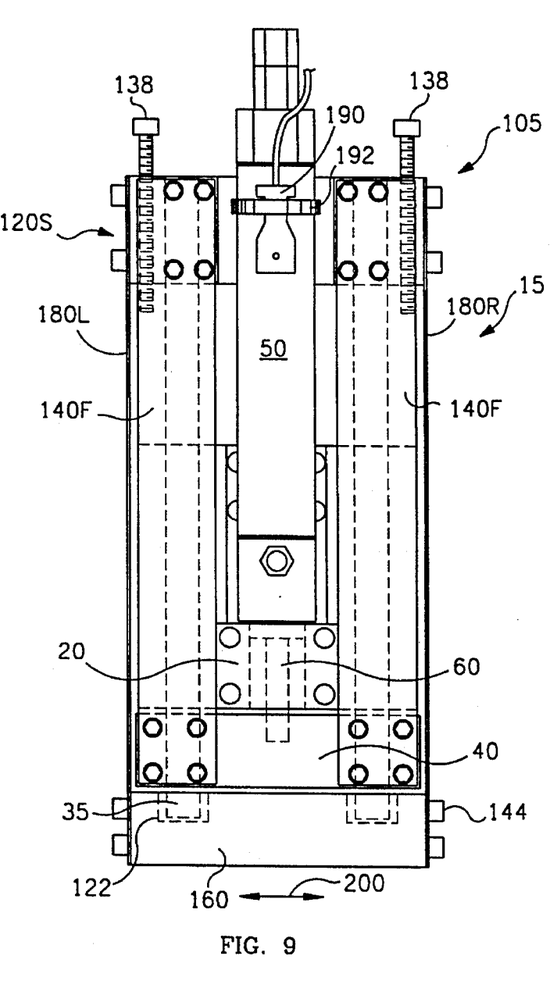
FIG. 9 is a front elevation view of the linear thruster of FIG. 8.
Figure 10:
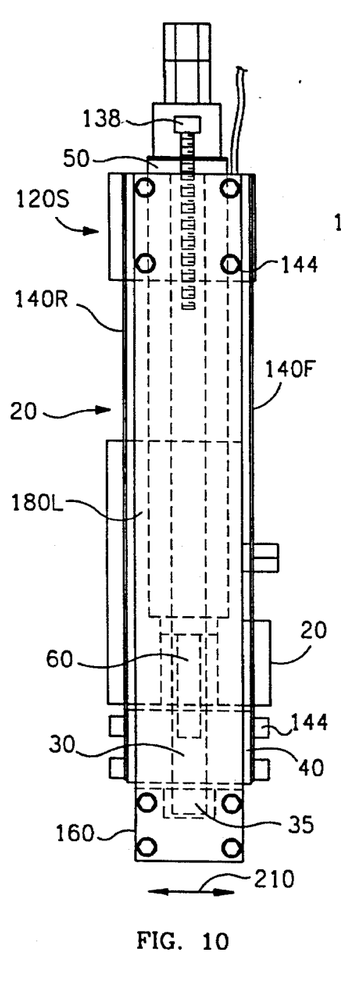
FIG. 10 is a left side view of the linear thruster of FIG. 9.
Figure 11:
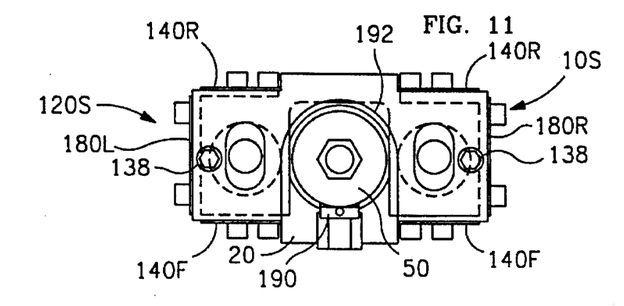
FIG. 11 is a top plan view of the linear thruster of FIG. 9.

FIGS. 8–11 show the application of compliant head 160 to a "short stroke" linear thruster 10S. FIG. 8 is an exploded view linear thruster 10S of the invention. FIG. 9 is a front elevation view of thruster 10S of FIG. 8. FIG. 10 is a left side view of thruster 10S of FIG. 9. FIG. 11 is a top plan view of thruster 10S of FIG. 9. Except as noted below, the elements and functions of thruster 10S can be assumed to be the same as those of thruster 10.

Thruster 10S generally comprises a thruster assembly 15 and a compliant head assembly 100. Thruster assembly 15 generally comprises housing 20, a pair of parallel guide rods 30 supported by bearings 29 in housing 20, a thrust plate 40 attached below housing 20 to guide rods 30, a power unit, such as pneumatic cylinder 50, and a thrust rod 60. In this regard, thruster 10S is similar to thruster 10. Compliant head assembly 100 includes a translation block 120S, a set of first leaf springs 140, a compliant head 160, and a set of second leaf springs 180. The major difference between thruster 10 and thruster 10S is that the thrust stroke of thruster 10S is short such that compliant head assembly 100 may be constructed around housing 20 at a savings of materials and valuable space in the crowded work environment of these machines.

First leaf springs 140 support translation block 120 from thrust plate 40 at a distance equal to or greater than the desired thrust stroke above housing 20. Therefore, first leaf springs 140 are disposed adjacent housing 20. Translation block 120S includes a large opening or indentation 135 adapted for placement around or over cylinder 50. The forward and rearward gap between translation block 120S and cylinder 20 should be larger than the forward and rearward gap between guide rods 30 and openings 130 in translation block 120S so that, when translation block 120S moves, it does not hit cylinder 50.

A stroke adjustment means operating between translation block 120S and housing 20 adjustably controls the minimum distance between translation block 120S and housing 20 and, consequently, the maximum length of the thrust stroke. Stroke adjustment means includes vertical threaded bores 137 through translation block 120S and adjusting stop screw means, such as adjusting stop screw 138, therein adjustably protruding below translation block 120S for contacting housing 120 for preventing further downward movement of translation block 120S.

Second leaf springs 180 support compliant head 160 from translation block 120 at a position below thrust plate 40 as previously described. In doing so, second leaf springs 180 pass adjacent housing 20.

In this manner, adding compliant head 160 to thruster assembly 15 only increases the length of thruster 10S by the height of compliant head 160 and the gap between compliant head 160 and thrust plate 40.

Cylinder 50 includes a piston position indicator, such as a magnet on the piston. Position sensor 190, attached to the outside of cylinder 50 with resilient strap 102, detects the location of the magnet and, in response thereto, signals a control unit for activating or deactivation cylinder 50. Location sensor 190 is moved along the length of cylinder 50 to adjust sensing location. Indentation 135 aids in the positioning and movement of location sensor 190.

FIGS. 12 and 13 illustrate devices for restricting compliance in either the retracted or extended position. FIG. 12 is a front elevation view of linear thruster 10S of similar to that of FIG. 9 including means 150, 153 for restricting compliance in the retracted position. FIG. 13 is a partial front elevation view of linear thruster 10S including a means 193 for restricting compliance in the extended position.

In FIG. 12, translation block restriction means 150 cooperates in the retracted position between housing 20 and compliant head 120S for stopping movement of said translation block 120S and, thereby, froward/rearward movement of compliant head 120S. Translation block restriction means 150 comprises a rigid post 151 attached to housing 20 cooperating in the retracted position with a post bore 152. Alternatively, positions of post 151 and bore 152 could be reversed. Rigid post 151 is preferably of hardened steel with a tapered point. Bore 152 may include a hardened drill bushing at its entrance. The shape of post 151 relative to bore 152 determines the restriction on movement.

Compliant head retracted restriction means 153 cooperates in the retracted position between housing 20 and compliant head for restricting or stopping forward-backward and left-right movement of compliant head 160 in the retracted position. Compliant head retracted restriction means 153 includes rigid pin 154 attached to housing 20 or compliant head 160 and cooperating in the retracted position with pin bore 155 in the other, housing 20 or compliant head 160, adapted to receive pin 154 and to allow a pre-determined amount of forward-backward and left-right movement of pin 154 therein or allow no movement dependant upon configuration. For this purpose, means, such as thrust plate bore 156, may be required for allowing pin 154 to freely pass through thrust plate 40. Rigid pin 154 is preferably of hardened steel with a tapered point. Bore 155 may include a hardened drill bushing 157 at its entrance. As in all the similar movement restrictions, the shape of pin 154 relative to bushing 157 or bore 155 determines the limitations on motion. Although a short stroke linear thruster 10S is shown, restriction means 153 is applicable also to a long stroke thruster 10.

Turning now to FIG. 13, extended position restriction means 193 cooperates in the extended position between housing 20 and compliant head 160 for stopping or restricting forward-backward and left-right movement of compliant head 160 in the extended position. In the preferred embodiment shown, extended position restriction means 193 comprises a sleeve 194 integral with compliant head 160 and extending upward therefrom and including a bore 195 including a restricted portion 196, an opening 197 through thrust plate 40 for disposition of sleeve 194, and shaft 198 having enlarged head 199 attached to housing 20. In the retracted position, shaft 198 freely moves in sleeve bore 195. In the extended position, shaft head 199 is disposed in restricted portion 196 such that movement of compliant head 160 is prevented or restricted.

It can be seen that the linear thruster as shown and described includes a compliant head that provides precise registration when desired, is easily aligned, retains alignment and returns to center after each deflection, is crash resistant and compact in size.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

In the appended claims the directional terms, e g "down", "up", "front", "rear" "vertical" and "horizontal", are used for simplicity to describe relative directions and are not necessarily literal.

I claim:

1. A linear thruster comprising:
   a thrust rod movable in a thrust direction defining a thrust axis from a retracted position to an extended position;
   a thrust plate connected to said thrust rod and moveable therewith;
   a translation block;
   a first leaf spring connecting, in the direction of the thrust axis and opposite said thrust direction, said translation block to said thrust plate such that said translation block has a movement axis due to resiliency of said first leaf spring, orthogonal to the thrust axis;
   a compliant head;
   a second leaf spring connecting, in the thrust direction, said compliant head to said translation block such that said compliant head can move orthogonal in all directions to the thrust axis.

2. The linear thruster of claim 1 wherein:
   said compliant head can move, due to resiliency of said second leaf spring, orthogonal to the thrust direction and orthogonal to the movement axis of said translation block and can move parallel to the movement axis of said translation block.

3. A linear thruster comprising:
   a thrust rod movable in a thrust direction defining a thrust axis from a retracted position to an extended position;
   a thrust plate connected to said thrust rod and moveable therewith;
   a translation block;
   a plurality of spaced, parallel first leaf springs connecting, in the direction of the thrust axis and opposite said thrust direction, said translation block to said thrust plate such that said translation block has a movement axis, due to resiliency of said first leaf springs, orthogonal to the thrust axis;
   a compliant head;
   a plurality of spaced, parallel second leaf springs connecting, in the thrust direction, said compliant head to said translation block such that said compliant head can move orthogonal in all directions to the thrust axis.

4. The linear thruster of claim 3 wherein:
   said compliant head can move, due to resiliency said second leaf springs, orthogonal to the thrust direction and orthogonal to the movement axis of said translation block and can move parallel to the movement axis of said translation block.

5. A linear thruster comprising:
   a housing;
   a plurality of spaced, parallel guide rods supported by said housing in vertical sliding axial movement with respect to said housing;
   a thrust plate attached below said housing to said guide rods and moveable therewith in a thrust direction defining a thrust axis from a retracted position to an extended position; said thrust plate including:
      a front side; and
      a rear side;
   a thrust rod attached to said thrust plate for moving said thrust plate;
   a power unit attached to said housing and operatively connected to said thrust rod for moving said thrust rod;
   a translation block including:
      a front side;
      a rear side;
      a left side; and
      a right side;
   a pair of parallel, spaced first leaf springs comprising:
      a front leaf spring connecting said thrust plate front side with said translation block front side; and
      a rear leaf spring connecting said thrust plate rear side with said translation block rear side; said first leaf springs supporting said translation block above said thrust plate such that said translation block can move forward and rearward due to resiliency of said first leaf springs;
   a compliant head including:
      a left side; and
      a right side;
   a pair of parallel, spaced second leaf springs comprising:
      a left leaf spring connecting said translation block left side with said compliant head left side; and
      a right leaf spring connecting said translation block right side with said compliant head right side; said second leaf springs supporting said compliant head from said translation block at a position below said thrust plate such that said compliant head can move left and right due to resiliency of said second leaf springs and forward and rearward with movement of said translation block.

6. The linear thruster of claim 5 wherein:
   a said guide rod includes a rod extension extending downward from said thrust plate; and
   said compliant head includes a bore receiving said rod extension; said bore and said rod extension cooperating to allow a pre-determined amount of forward-backward and left-right movement of said translation block relative to said thrust plate.

7. The linear thruster of claim 5 further including:
   retracted restriction means cooperating in the retracted position between said housing and said compliant head for restricting forward-backward and left-right movement of said compliant head in the retracted position.

8. The linear thruster of claim 7 wherein:
   said retracted restriction means comprises:
      a rigid pin attached to said housing or said compliant head and cooperating in the retracted position with a pin bore; and
      a pin bore in the other of said housing or said compliant head adapted to receive said pin and to allow a pre-determined amount of forward-backward and left-right movement of said pin therein.

9. The linear thruster of claim 5 further including:
   extended restriction means cooperating in the extended position between said housing and said compliant head for restricting forward-backward and left-right movement of said compliant head in the extended position.

10. The linear thruster of claim 9 wherein:
    said extended restriction means comprises:
       a shaft attached to said housing and cooperating in the retracted position with a shaft bore; and
       a sleeve attached to said compliant head, adapted to receive said shaft and to restrict the amount of forward-backward and left-right movement of said shaft therein.

11. The linear thruster of claim 5 wherein:

said translation block includes:
openings receiving said guide rods.

12. The linear thruster of claim 11 wherein:

said guide rod openings are adapted to prevent left-right movement of said translation block relative to said guide rods and to allow a pre-determined amount of forward-backward movement of said translation block relative to said guide rods.

13. The linear thruster of claim 12 wherein:

a said guide rod includes a rod extension extending downward from said thrust plate; and said compliant head includes a bore receiving said rod extension; said bore and rod extension cooperating to allow a pre-determined amount of forward-backward and left-right movement of said translation block relative to said thrust plate.

14. The linear thruster of claim 12 further including:

crash protection means operating between said thrust plate and said compliant head for allowing a pre-determined amount of forward-backward and left-right movement of said compliant head relative to said thrust plate.

15. The linear thruster of claim 14 wherein:

said crash protection means comprises:
a crash bolt protruding from said thrust plate or said compliant head; and
a crash bore in the other of said thrust plate or said compliant head cooperating with said crash bolt and adapted to allow a pre-determined amount of forward-backward and left-right movement of said crash bolt therein.

16. A linear thruster comprising:

a housing;

a plurality of spaced, parallel guide rods supported by said housing in vertical sliding axial movement with respect to said housing;

a thrust plate attached below said housing to said guide rods and moveable therewith from a retracted position to an extended position defining a thrust axis; said thrust plate including:
a front side; and
a rear side;

a thrust rod attached to said thrust plate for moving said thrust plate;

a power unit attached to said housing and operatively connected to said thrust rod for moving said thrust rod;

a translation block including:
a front side;
a rear side;
a left side; and
a right side;

a pair of parallel, spaced first leaf springs comprising:
a front leaf spring connecting said thrust plate front side with said translation block front side; and
a rear leaf spring connecting said thrust plate rear side with said translation block rear side; said first leaf springs supporting said translation block above said housing such that said translation block can move forward and rearward due to resiliency of said first leaf springs;

a compliant head including:
a left side; and
a right side;

a pair of parallel, spaced second leaf springs comprising:
a left leaf spring connecting said translation block left side with said compliant head left side; and
a right leaf spring connecting said translation block right side with said compliant head right side; said second leaf springs supporting said compliant head from said translation block at a position below said thrust plate such that said compliant head can move left and right due to resiliency of said second leaf springs and forward and rearward with movement of said translation block.

17. The linear thruster of claim 16 further including:

stroke adjustment means operating between said translation block and said housing for adjustably controlling the minimum distance of said translation block to said housing.

18. The linear thruster of claim 16 wherein:

said translation block includes:
a vertical bore therethrough; and further including:

set screw means in said translation block vertical bore and adjustably protruding below said translation block for contacting said housing for adjustably controlling the minimum distance of said translation block to said housing.

19. The linear thruster of claim 16 wherein:

a said guide rod includes a rod extension extending downward from said thrust plate; and said compliant head includes a bore receiving said rod extension; said bore and said rod extension cooperating to allow a pre-determined amount of forward-backward and left-right movement of said translation block relative to said thrust plate.

20. The linear thruster of claim 16 wherein:

said translation block includes:
openings receiving said guide rods.

21. The linear thruster of claim 20 wherein:

said guide rod openings are adapted to prevent left-right movement of said translation block relative to said guide rods and to allow a pre-determined amount of forward-backward movement of said translation block relative to said guide rods.

22. The linear thruster of claim 16 wherein:

a said guide rod includes a rod extension extending downward from said thrust plate; and said compliant head includes a bore receiving said rod extension; said bore and said rod extension cooperating to allow a pre-determined amount of forward-backward and left-right movement of said translation block relative to said thrust plate.

23. The linear thruster of claim 16 further including:

crash protection means operating between said thrust plate and said compliant head for allowing a pre-determined amount of forward-backward and left-right movement of said compliant head relative to said thrust plate.

24. The linear thruster of claim 23 wherein:

said crash protection means comprises:
a crash bolt protruding from said thrust plate or said compliant head; and
a crash bore in the other said thrust plate or said compliant head and cooperating with said crash bolt.

25. The linear thruster of claim 16 further including:

retracted restriction means cooperating in the retracted position between said housing and said compliant head for restricting forward-backward and left-right movement of said compliant head in the retracted position.

26. The linear thruster of claim 25 wherein:

said retracted restriction means comprises:
- a rigid pin attached to said housing or said compliant head and cooperating in the retracted position with a pin bore; and
- a pin bore in the other said housing or said compliant head adapted to receive said pin and to allow a pre-determined amount of forward-backward and left-right movement of said pin therein.

27. The linear thruster of claim 16 further including:

translation block restriction means cooperating in the retracted position between said housing and said translation block for restricting forward-backward movement of said translation block in the retracted position.

28. The linear thruster of claim 27 wherein:

said translation block restriction means comprises:
- a post attached to said housing or said translation block and cooperating in the retracted position with a post bore; and
- a post bore in the other said housing or said compliant head adapted to receive said shaft and to allow a pre-determined amount of forward-backward movement of said shaft therein.

29. The linear thruster of claim 16 further including:

extended restriction means cooperating in the extended position between said housing and said compliant head for restricting forward-backward and left-right movement of said compliant head in the extended position.

30. The linear thruster of claim 29 wherein:

said extended restriction means comprises:
- a shaft attached to said housing and cooperating in the retracted position with a shaft bore; and
- a shaft bore attached to said compliant head, adapted to receive said pin and to restrict the amount of forward-backward and left-right movement of said shaft therein.

31. A linear thruster comprising:

a housing;

a plurality of spaced, parallel guide rods supported by said housing in vertical sliding axial movement with respect to said housing;

a thrust plate attached below said housing to said guide rods and moveable therewith in a thrust direction defining a thrust axis from a retracted position to an extended position; said thrust plate including:
- a front side; and
- a rear side;

a thrust rod attached to said thrust plate for moving said thrust plate;

a power unit attached to said housing and operatively connected to said thrust rod for moving said thrust rod;

a translation block including:
- a front side;
- a rear side;
- a left side;
- a right side; and
- openings receiving said guide rods; said guide rod openings adapted to prevent left-right movement of said translation block relative to said guide rods and to allow a pre-determined amount of forward-backward movement of said translation block relative to said guide rods;

a constant length spring connected to said thrust plate and to said translation block and supporting said translation block above said thrust plate such that said translation block can move forward and rearward, but not substantially up and down, due to resiliency of said constant length spring;

a compliant head including:
- a left side; and
- a right side;

a leaf spring connected to said translation block and to said compliant head right side and supporting said compliant head from said translation block at a position below said thrust plate such that said compliant head can move left and right due to resiliency of said leaf spring and forward and rearward with movement of said translation block.

* * * * *